United States Patent
Kim et al.

(10) Patent No.: US 8,705,562 B2
(45) Date of Patent: Apr. 22, 2014

(54) METHOD OF MEDIUM ACCESS CONTROL IN WIRELESS LAN SYSTEM USING MULTIPLE CHANNELS

(75) Inventors: Yun-Joo Kim, Daejeon (KR); Jeeyon Choi, Daejeon (KR); Sok-Kyu Lee, Daejeon (KR)

(73) Assignee: Electronics and Telecommunications Research Institute, Daejon (KR)

( * ) Notice: Subject to any disclaimer, the term of this patent is extended or adjusted under 35 U.S.C. 154(b) by 341 days.

(21) Appl. No.: 12/688,079

(22) Filed: Jan. 15, 2010

(65) Prior Publication Data

US 2010/0177657 A1 Jul. 15, 2010

(30) Foreign Application Priority Data

Jan. 15, 2009 (KR) .......................... 10-2009-0003488

(51) Int. Cl.
*H04J 3/16* (2006.01)
*H04B 7/00* (2006.01)
*H04L 12/28* (2006.01)

(52) U.S. Cl.
USPC ........................... 370/465; 370/310; 370/351

(58) Field of Classification Search
USPC ........ 370/235, 241, 252, 310, 328, 329, 338, 370/351, 389, 392, 431, 432, 442, 458, 464, 370/465, 470, 472, 498
See application file for complete search history.

(56) References Cited

U.S. PATENT DOCUMENTS

| | | | | |
|---|---|---|---|---|
| 6,868,062 | B1* | 3/2005 | Yadav et al. | 370/234 |
| 2002/0003811 | A1* | 1/2002 | Herrmann | 370/474 |
| 2005/0147023 | A1* | 7/2005 | Stephens et al. | 370/203 |
| 2006/0221875 | A1* | 10/2006 | Trainin | 370/282 |
| 2007/0019592 | A1* | 1/2007 | Otsuki | 370/338 |
| 2007/0217759 | A1* | 9/2007 | Dodd | 386/68 |
| 2008/0186909 | A1* | 8/2008 | Kim et al. | 370/328 |
| 2011/0310807 | A1* | 12/2011 | Grandhi et al. | 370/328 |

* cited by examiner

*Primary Examiner* — Omar Ghowrwal
(74) *Attorney, Agent, or Firm* — Ladas & Parry LLP

(57) ABSTRACT

A medium access control method in a wireless LAN system using multiple channels includes: determining the size of data frames related to a plurality of wireless stations connected through multiple channels; adjusting the number or length of the data frames related to the respective wireless stations, based on the result of determination, so that transmission start time and transmission end time of the data frames coincide during a transmission duration of an access point; and transmitting the data frames, the number or length of which has been adjusted, to the respective wireless stations.

6 Claims, 4 Drawing Sheets

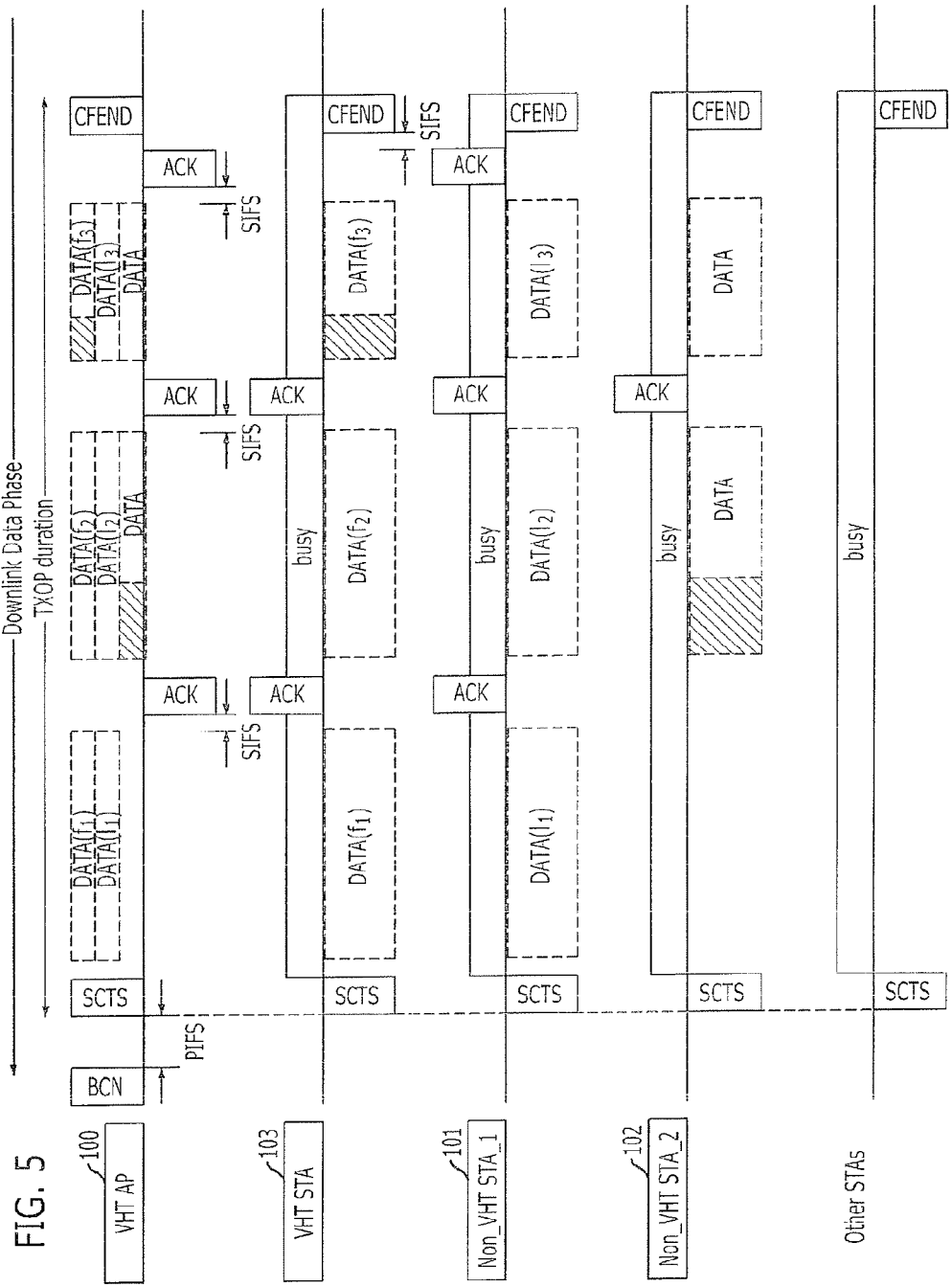

METHOD OF MEDIUM ACCESS CONTROL IN WIRELESS LAN SYSTEM USING MULTIPLE CHANNELS

CROSS-REFERENCE(S) TO RELATED APPLICATIONS

The present application claims priority of Korean Patent Application No. 10-2009-0003488, filed on Jan. 15, 2009, which is incorporated herein by reference in its entirety.

BACKGROUND OF THE INVENTION

1. Field of the Invention

Exemplary embodiments of the present invention relate to a medium access control method in a wireless LAN system using multiple channels; and, more particularly, to a medium access control method of an access point for providing a downlink service in a wireless LAN system using multiple channels.

2. Description of Related Art

There has been an ever-increasing demand for Internet availability, particularly through wireless LANs. A wireless LAN service is a service which provides an existing short-range wired communication service, i.e., a wired LAN service, by using a wireless medium as a data transmission medium. The Institute of Electrical and Electronics Engineers (IEEE) 802.11 Infrastructure scheme has been widely used as a wireless communication method. Wireless LAN technology has evolved into the IEEE 802.11n, which increases the data rate from the conventional level of tens of Mbps up to 600 Mbps.

A wireless LAN service enables a wireless station (STA), such as a notebook computer or a personal digital assistant (PDA), to receive a variety of services, e.g., a wireless Internet service, by using an access point which functions as a wired/wireless gateway. Specifically, a medium access control (MAC) protocol of a wireless LAN defined in the IEEE 802.11 basically supports a Basic Service Set (BSS) constituted by a wireless station and an access point which functions as an association point of a distributed system. The access point performs a function similar to a LAN hub. A single access point may provide a service to wireless stations placed in a preset service area. The service area refers to an area where the access point can provide a service to the wireless stations.

Recently, as wireless LAN users are rapidly increasing, there is a growing need for increasing data throughput which is provided in a single BSS, i.e., a wireless LAN system. To this end, much study has been conducted on systems which provide a wireless LAN service through multiple channels.

SUMMARY OF THE INVENTION

An embodiment of the present invention is directed to a medium access control method in a wireless LAN system using multiple channels, in which a single access point simultaneously controls multiple channels to provide a high throughput service to a plurality of wireless stations.

Another embodiment of the present invention is directed to a medium access control method in a wireless LAN system using multiple channels, which provides compatibility with a plurality of wireless stations and improves the performance and quality of service (QoS) of the wireless LAN system.

Other objects and advantages of the present invention can be understood by the following description, and become apparent with reference to the embodiments of the present invention. Also, it is obvious to those skilled in the art to which the present invention pertains that the objects and advantages of the present invention can be realized by the means as claimed and combinations thereof.

In accordance with an embodiment of the present invention, a medium access control method in a wireless LAN system using multiple channels includes: determining the size of data frames related to a plurality of wireless stations connected through multiple channels; adjusting the number or length of the data frames related to the respective wireless stations, based on the result of determination, so that transmission start time and transmission end time of the data frames coincide during a transmission duration of an access point; and transmitting the data frames, the number or length of which has been adjusted, to the respective wireless stations.

In accordance with another embodiment of the present invention, a medium access control method for medium access control in a wireless LAN system using multiple channels includes: determining the size of downlink data related to a plurality of wireless stations connected through multiple channels; generating data frames for the respective wireless stations, based on the result of determination, so that the transmission start time and transmission end time of the data frames coincide during a transmission duration of an access point; and transmitting the data frames to the respective wireless stations.

In accordance with another embodiment of the present invention, a medium access control method for medium access control in a wireless LAN system using multiple channels includes: generating data frames for a plurality of wireless stations connected through multiple channels; adjusting transmission time of the data frames, based on the length of the data frames within a transmission duration of an access point; and transmitting the data frames, the transmission time of which has been adjusted, to the respective wireless stations.

BRIEF DESCRIPTION OF THE DRAWINGS

FIG. 5 illustrates a medium access control method in accordance with another specific embodiment of the present invention.

DESCRIPTION OF SPECIFIC EMBODIMENTS

Figure 1:
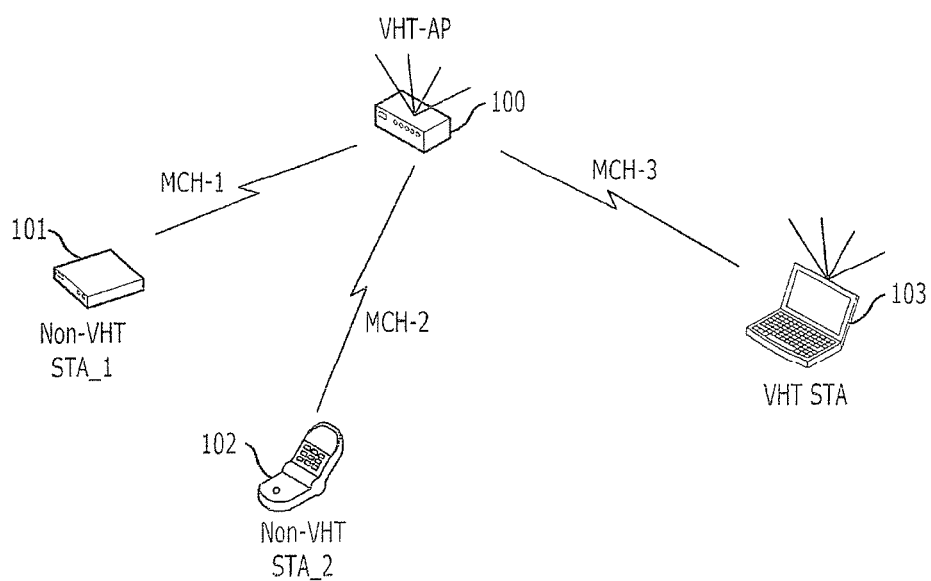
FIG. 1 illustrates a wireless LAN system using multiple channels in accordance with an embodiment of the present invention.

In order to guarantee a higher data rate than the above-described IEEE. 802.11n, a Task Group (TGac) has been created within the IEEE 802.11 Working Group (WG) to study next generation wireless LAN technology and is in the process of establishing a new standard to enable Gbps-level data transmission. For reference, the IEEE 802.11a/b/g standard, the IEEE 802.11e standard, and the IEEE 802.11n standard are referred to as a legacy mode, a QoS mode, and a High Throughput (HT) mode, respectively. In addition, the standard newly discussed by IEEE 802.11ac is referred to as a Very High Throughput (VHT) mode. Much study has been conducted on methods which simultaneously provide a wireless LAN service to a plurality of wireless station through multiple channels in the IEEE.802.11ac.

The embodiments of the present invention are directed to a medium access control method in a wireless LAN system using multiple channels, i.e., a multiple channel basic service set (MUCH-BSS), when an access point transmits data to a plurality of wireless stations. Specifically, the embodiments of the present invention are directed to a method for managing at least one wireless station connected through multiple channels, based on the frame exchange sequence of request-to-send (RTS)/clear-to-send (CTS)/DATA/ACK defined in the IEEE 802.11 MAC specification. Furthermore, the medium access control method in accordance with the embodiment of the present invention controls the access point in such a manner that the transmission start time and the transmission end time of data frames coincide with each other with respect to a plurality of wireless stations.

As such, compatibility with a plurality of wireless stations is supported, and a wireless LAN service is provided to a plurality of wireless stations, regardless of the wireless LAN mode supported by each wireless station.

Exemplary embodiments of the present invention will be described below in more detail with reference to the accompanying drawings. The present invention may, however, be embodied in different forms and should not be constructed as limited to the embodiments set forth herein. Rather, these embodiments are provided so that this disclosure will be thorough and complete, and will fully convey the scope of the present invention to those skilled in the art. Throughout the disclosure, like reference numerals refer to like parts throughout the various figures and embodiments of the present invention.

FIG. 1 illustrates a wireless LAN system using multiple channels in accordance with an embodiment of the present invention.

Referring to FIG. 1, the wireless LAN system in accordance with the embodiment of the present invention includes an access point 100 and first to third wireless stations 101 to 103. The first and second wireless stations 101 and 102 are wireless stations having a non-VHT mode, e.g., a legacy mode or an HT mode, which does support a VHT mode. The access point 100 is a VHT access point which supports a VHT mode, and the third wireless station 103 is a VHT wireless stations which supports a VHT mode. Like the wireless LAN system of FIG. 1, the embodiment of the present invention provides a medium access control method which is capable of providing compatibility in a wireless LAN system including both the non-VHT wireless station and the VHT wireless stations, thereby providing a wireless LAN service to the plurality of wireless station.

The wireless LAN system in accordance with the embodiment of the present invention uses a 20-MHz bandwidth as a basic bandwidth in order for compatibility with a general wireless station defined in the IEEE 802.11 MAC specification, and may support a 40-MHz bandwidth according to the specification defined in the IEEE 802.11. The number of the multiple channels supported in the embodiment of the present invention may be changed according to the bandwidth.

The access point 100 controls the multiple channels MCH_1 to MCH_3 independently in accordance with a CSMA/CA protocol, and provides a wireless LAN service to the first to third wireless stations 101 to 103. In this case, the multiple channel configuration between the access point 100 and the wireless stations 101 to 103 is established according to the characteristics of the wireless stations 101 to 103 and the service characteristics required in the wireless stations 101 to 103. In an MU-MIMO physical layer of the access point which supports the multiple channels MCH_1 to MCH_3, different beams configured not to interfere the respective multiple channels MCH_1 to MCH_3 are used, and data may be transmitted to the wireless stations 101 to 103 through the multiple channels MCH_I to MCH_3.

The access point 100 and the first to third wireless stations 101 to 103 conduct an association process, and the first to third wireless stations 101 to 103 connect to the access point 100 through different channels MCH_1 to MCH_3. The access point 100 and the first to third wireless stations 101 to 103 then perform a backoff to acquire a transmission opportunity.

The access point 100 having acquired a transmission opportunity transmits a data frame for a downlink service to the first to third wireless stations 101 to 103. The first to third wireless stations 101 to 103 having received the data frame through different channels MCH_1 to MCH_3 transmit an ACK frame to the access point 100. In the wireless LAN system, since an access point and a wireless station cannot simultaneously transmit and receive frames, a data frame and an ACK frame are transmitted alternately between an access point and a wireless station.

In a wireless LAN system using a single channel, a wireless station and an access point can exchange data and an ACK frame with little problems. However, in a wireless LAN system using multiple channels, a plurality of wireless stations, which have different wireless LAN modes, exchange data and an ACK frame with the access point. Also, since the size of data frames transmitted to the wireless stations are also different. Hence, it is necessary to control the size or length of data frames transmitted to a plurality of wireless stations.

In accordance with the embodiment of the present invention, the access point 100 considers the size of data frames to be transmitted to the first to third wireless stations 101 to 103, and accordingly adjusts the number or length of data frames, or adjusts the transmission time of data frames. More specifically, the access point 100 adjusts the number or length of data frames in such a manner that the transmission start time and transmission end time data frames coincide during the transmission duration (TXOP) of the access point 100, and transmits the data frames, the number or length of which has been adjusted, to the first to third wireless stations 101 to 103. Alternatively, the access point 100 adjusts the transmission time of data frames based on the length of data frames within the transmission duration of the access point 100.

Therefore, by transmitting the adjusted data frames to the first to third wireless stations 101 to 103, the first to third wireless stations 101 to 103 can not only finish receiving data frames simultaneously, but also transmit ACK frames to the access point 100 simultaneously. Furthermore, the wireless stations included in the wireless LAN system using multiple channels are provided with a wireless LAN service, regardless of the wireless LAN mode they support. That is, compatibility is guaranteed.

Although the wireless LAN system including the three VHT and non-VHT wireless stations has been described with reference to FIG. 1, the present invention is also applicable to other wireless LAN systems which support a larger number of multiple channels as required by system design.

Figure 2:
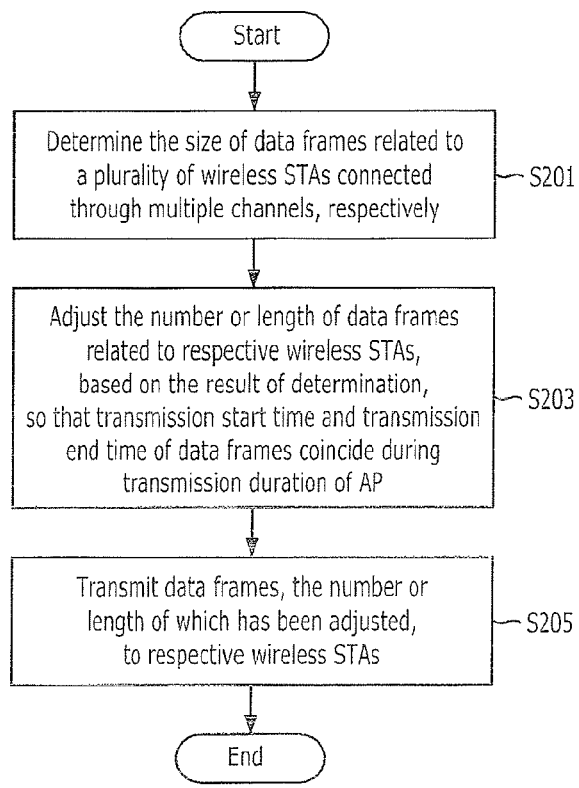
FIG. 2 illustrates a medium access control method in a wireless LAN system using multiple channels in accordance with an embodiment of the present invention.

FIG. 2 illustrates a medium access control method in a wireless LAN system using multiple channels in accordance with an embodiment of the present invention. Specifically, the medium access control method will be described with reference to the wireless LAN system illustrated in FIG. 1.

Referring to FIG. 2, the medium access control method in accordance with the embodiment of the present invention starts with step S201.

At step S201, the access point 100 determines the size of data frames related to the plurality of wireless stations 101 to 103 connected through multiple channels MCH_1 to MCH_3, respectively. As mentioned above, the plurality of wireless stations included in the wireless LAN system are different in wireless LAN modes and the size (i.e. length and number) of downlink data frames.

Based on the result of determination made at the step S201, the access point 100 adjusts the number or length of data frames related to the plurality of wireless stations 101 to 103 at step S203, so that the transmission start time and transmission end time of the data frames coincide during the transmission duration of the access point 100. More specifically, the access point 100 may fragment data frames related to the first to third wireless stations 101 to 103, or add null data to the data frames related to the first to third wireless stations 101 to 103, so that the number or length of the data frames is adjusted. The null data may be added to the front or rear portion of the data frames.

Figure 3:
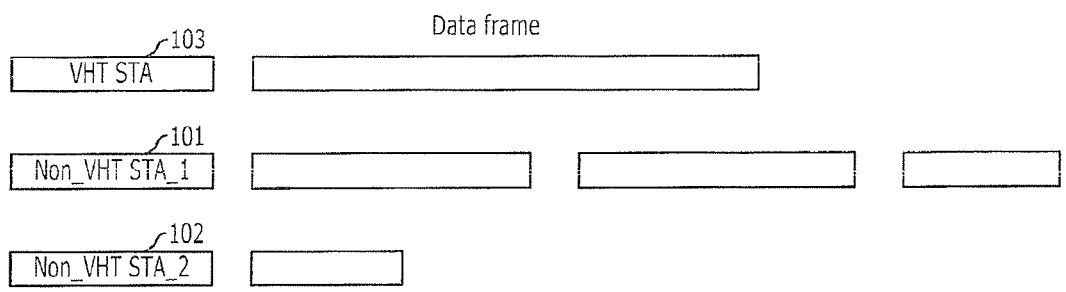
FIG. 3 illustrates data frames for third wireless stations 101 to 103, respectively.

Referring to FIG. 3, which illustrates exemplary data frames related to the first to third wireless stations 101 to 103, respectively, three data frames are to be transmitted to the first wireless station 101, one data frame is to be transmitted to the second wireless station 102, and one data frame is to be transmitted to the third wireless station 103. The access point 100 may add null data to the data frame related to the second wireless station 102, and fragment the data frame related to the third wireless station 103, so that the transmission start time and transmission end time of data frames to the first to third wireless stations 101 to 103 coincide.

Meanwhile, the above-mentioned data frames are MPDUs based on a MAC protocol, and the length of MPDUs related to the first to third wireless stations 101 to 103 may be different depending on the wireless LAN mode they support. Therefore, if the first to third wireless stations 101 to 103 support different lengths of data frames, the access point 100 may adjust the number or length of data frames based on the length of data frames related to the wireless station that supports the smallest length of data frames. The access point 100 may also adjust the number or length of data frames based on the length of the longest one of data frames transmitted by a wireless station, which supports the smallest length of data frames, during the transmission duration of the access point 100, as will be described in more detail with reference to FIG. 4.

At step S205, the access point 100 transmits the data frames, the number or length of which has been adjusted, to the plurality of wireless stations 101 to 103, respectively. The first to third wireless stations 101 to 103 having received the data frames from the access point 100 may transmit ACK frames to the access point 100.

Meanwhile, although it has been assumed in the above description that the access point 100 creates data frames and then adjusts the length or number of the created data frames, the access point 100 may also create data frames after determining the size of downlink data related to the plurality of wireless stations 101 to 103 connected through the multiple channels MCH_1 to MCH_3, respectively.

Specifically, a medium access control method in accordance with another embodiment of the present invention may include the following steps: the access point 100 determines the size of downlink data related to the plurality of wireless stations 101 to 103 connected through the multiple channels MCH_1 to MCH_3, respectively; based on the result of determination, the access point 100 creates data frames for the plurality of wireless stations 101 to 103 so that the transmission start time and transmission end time of the data frames coincide during the transmission duration of the access point 100; and the access point 100 transmits the data frames to the plurality of wireless stations 101 to 103. That is, in accordance with another embodiment of the present invention, the access point 100 determines the size of data to be transmitted to the plurality of the wireless stations 101 to 103 before data frames are created.

More specifically, the creating of the data frames by the access point 100 may include: creating data frames for the plurality of wireless stations 101 to 103; and adjusting the number or length of the data frames created for the plurality of wireless stations 101 to 103 based on the number and length of the created data frames.

Meanwhile, as has been described with reference to FIG. 1, the access point 100 may also adjust the transmission time of data frames to the first to third wireless stations 101 to 103, and then transmit them.

Specifically, a medium access control method in accordance with another embodiment of the present invention may include the following steps: the access point 100 creates data frames for the plurality of wireless stations 101 to 103 connected through the multiple channels MCH_1 to MCH_3, respectively; the access point 100 adjusts the transmission time of the data frames based on the length of data frames within the transmission duration of the access point 100; and the access point 100 transmits the data frames, the transmission time of which has been adjusted, to the plurality of wireless stations 101 to 103.

Referring to FIG. 3, the data frame related to the second wireless station 102 is shorter than the data frame related to the third wireless station 103. This means that the transmission end time of the data frame to the second wireless station 102 precedes that of the data frame to the third wireless station 103. Considering this, the access point 100 may delay the transmission time of the data frame to the second wireless station 102 so that the transmission end time of the data frames to the second and third wireless stations 102 and 103 coincide. Furthermore, the above-mentioned method for adjusting the number or length of data frames may be employed together with the method for adjusting the transmission time of data frames.

The transmission duration of the access point 100, described above, may be determined by a CTS-to-self (SCTS) frame and a CF-end frame transmitted by the access point 100.

Figure 4:
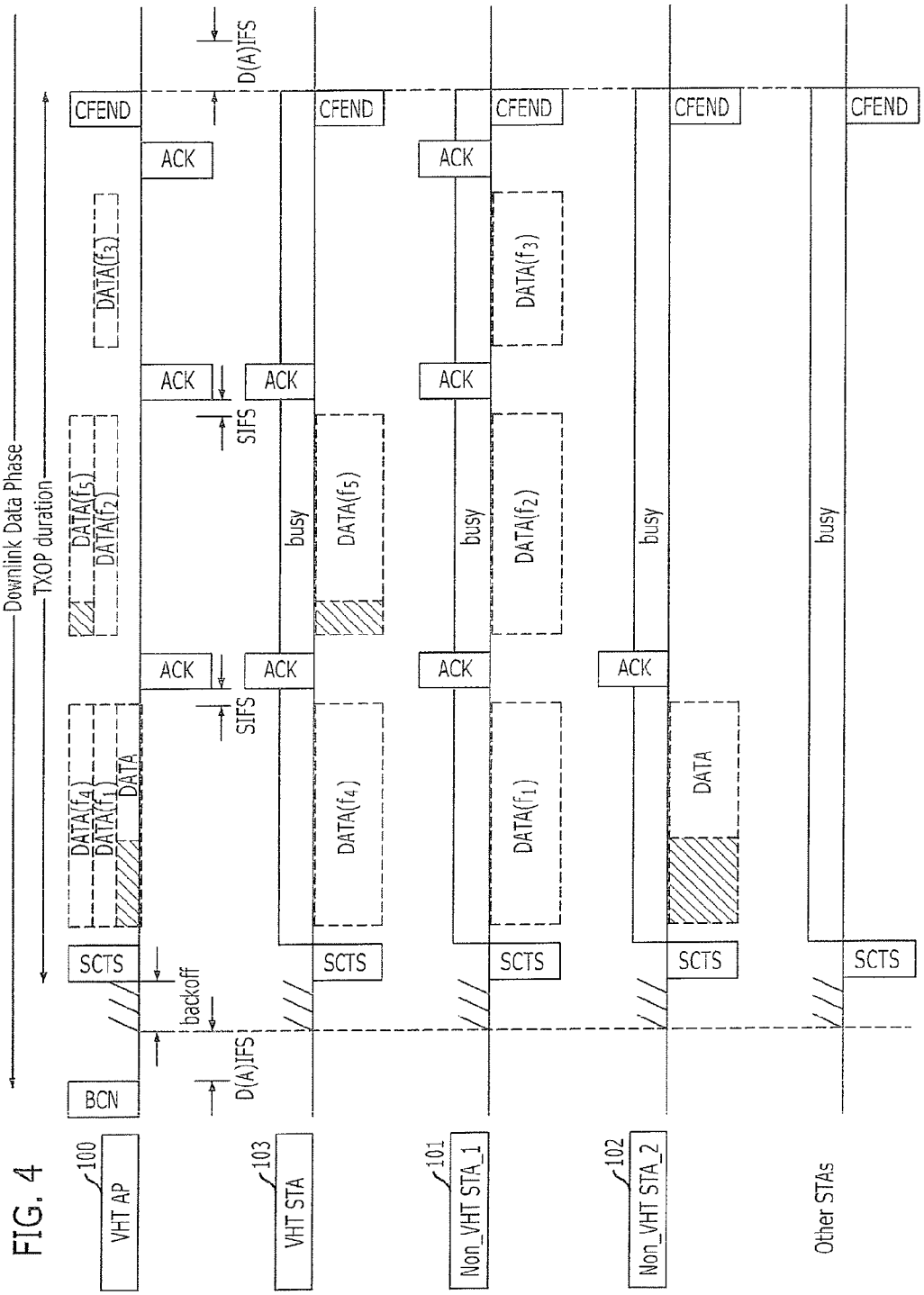
FIG. 4 illustrates a medium access control method in accordance with a specific embodiment of the present invention.

FIG. 4 illustrates a medium access control method in accordance with a specific embodiment of the present invention. It will be assumed in the following description with reference to FIG. 4 that an access point 100 acquires a transmission opportunity and provides a wireless LAN service to first to third wireless stations 101 to 103. In FIG. 4, transmission frames are shown above horizontal lines, and reception frames are shown below horizontal lines. Frames indicated by dotted lines represent beamformed frames related to specific wireless stations.

The access point 100 broadcasts a beacon frame (BCN). After a DCF interframe space or arbitration interframe space (D(A)IFS), the access point 100 and the first to third wireless stations 101 to 103 perform a backoff to acquire a transmission opportunity.

The access point 100 having acquired a transmission opportunity transmits data frames to the first to third wireless stations 101 to 103 during the transmission duration of the access point 100. As mentioned above, the transmission duration of the access point 100 is determined by an SCTS frame and a CF-end frame. Specifically, the access point 100 transmits a SCTS frame so that the first to third wireless stations 101 to 103 recognize that the channels are busy, and then start to transmit data frames. After transmitting all data frames, the access point 100 transmits a CF-end frame to inform the first to third wireless stations 101 to 103 that the channels are no longer busy.

The SCTS frame includes a network allocation vector (NAV) value, which is determined by the length of the longest one of data frames related to the first to third wireless stations 101 to 103. The first to third wireless stations 101 to 103 set the channels to a busy state as long as the NAV value included in the SCTS frame remains valid, and receive data frames. This means that, if the NAV value is not determined based on the largest data frame length, a process of acquiring a transmission opportunity may erroneously occur even when the first to third wireless stations 101 to 103 are receiving data.

The first to third wireless stations 101 to 103 then receive a CF-end frame from the access point 100, reset the NAV value, and set the channels to an idle state. The first to third wireless stations 101 to 103 proceed to acquire a transmission opportunity.

The access point 100 transmits a SCTS frame and, after a short interframe space (SIFS), starts to transmit data frames. The access point 100 adjusts the number or length of data frames related to the first to third wireless stations 101 to 103 based on the size of the data frames so that the transmission start time and transmission end time of he data frames coincide.

A case where data frames related to the first to third wireless stations 101 to 103 are the data frames of FIG. 3 will be described below with reference to FIG. 4. If the first to third wireless stations 101 to 103 support different lengths of data frames, the access point 100 then adjusts the number or length of data frames based on data frames related to a wireless station, which supports the smallest length of data frames. This is because VHT and non-VHT wireless stations support different lengths of MPDUs. In other words, the first and second wireless stations 101 and 102 cannot receive the same length of data frames as that of data frames related to the third wireless station 103.

More specifically, referring to FIG. 4, the access point 100 fragments the single data frame, which is to be transmitted to the third wireless station 103, into two data frames based on the length of the data frame transmitted to the second wireless station 102, even though the single data frame may be transmitted without fragmentation. Furthermore, the access point 100 adds null data to the data frame related to the third wireless station 103 so that the transmission start time and transmission end time of data frames coincide. The null data is indicated by shaded parts of data frames in FIG. 4.

The length of data frames supported by the second wireless station 102 is the same as that supported by the first wireless station 101. However, the access point 100 adds null data to the data frame related to the second wireless station 102 so that the transmission start time and transmission end time of data frames coincide.

Meanwhile, the access point 100 may adjust the number or length of data frames based on the length of the longest one of data frames related to a wireless station, which supports the smallest length of data frames, during the transmission duration of the access point 100. Specifically, the access point 100 may adjust the number or length of data frames based on the length of the longest one of data frames related to the first and second wireless stations 101 and 102. It is obvious from FIG. 4 that the access point 100 has fragmented the data frame related to the third wireless station 103 based on the length of data frames related to the first wireless station 101, not the second wireless station 102.

This is because, if the access point 100 adjusts the number or length of data frames based on the length of a too short one of data frames related to the first and second wireless stations 101 and 102, the access point 100 will have to fragment the data frame related to the third wireless station 103 into too many data frames, which means inefficient channel usage.

After receiving data frames, the first to third wireless stations 101 to 103 transmit ACK frames after an SIFS. After receiving the ACK frames, the access point 100 similarly transmits data frames after an SIFS. After transmitting all data frames, the access point 100 transmits CF-end frames. The first to third wireless stations 101 to 103 receive the CF-end frames, reset the NAV value, and perform a backoff again after a D(A)IFS.

As such, in accordance with the embodiment of the present invention shown in FIG. 4, the transmission start time and transmission end time of data frames to the first to third wireless stations 101 to 103 coincide, which can simultaneously transmit ACK frames to the access point 100 via different channels MCH_1 to MCH_3.

FIG. 5 illustrates a medium access control method in accordance with another specific embodiment of the present invention. It will be assumed in the following description with reference to FIG. 5 that an access point 100 acquires a transmission opportunity and provides a wireless LAN service to first to third wireless stations 101 to 103, as in the case of FIG. 4. In FIG. 5, transmission frames are shown above horizontal lines, and reception frames are shown below horizontal lines. Frames indicated by dotted lines represent beamformed frames related to specific wireless stations, which receive and decodes the beamformed frames.

It will be assumed in the description of an embodiment with reference to FIG. 5 that, when the access point 100 proceeds to acquire a transmission opportunity, priority is given to the downlink service of the access point 100, unlike the embodiment shown in FIG. 4. In other words, the access point 100 does not compete with other wireless stations. The access point 100 transmits a BCN and, if the channels become idle, transmits SCTS frames to the first to third wireless stations 101 to 103 immediately after a PCF interframe space (PIFS).

It is obvious from FIG. 5 that the access point 100 adds null data to data frames related to the second and third wireless stations 102 and 103, based on the data frames related to the first wireless station 101, and transmits data frames to the first to third wireless stations 101 to 103.

Although the present invention has been described in terms of process, each step constituting the medium access control method in the wireless LAN system using multiple channels in accordance with the present invention can also be understood easily in terms of device. That is, the respective steps of the medium access control method in the wireless LAN system using multiple channels in accordance with the present invention may be understood as components of an access point as well as a medium access control device of the access point in a wireless LAN system using multiple channels in accordance with the principle of the present invention.

Specifically, the access point includes: a determination unit configured to determine the size of data frames related to a plurality of wireless stations connected through multiple channels; a control unit configured to adjust the number or length of the data frames related to the respective wireless stations, based on the result of determination, so that transmission start time and transmission end time of the data frames coincide during a transmission duration of an access point; and a transmission unit configured to transmit the data frames, the number or length of which has been adjusted, to the respective wireless stations.

Alternatively, the access point includes: a determination unit configured to determine the size of downlink data related to a plurality of wireless stations connected through multiple channels; a creation unit configured to create data frames for the respective wireless stations, based on the result of determination, so that the transmission start time and transmission end time of the data frames coincide during a transmission duration of an access point; and a transmission unit configured to transmit the data frames to the respective wireless stations.

Alternatively, the access point includes: a creation unit configured to create data frames for a plurality of wireless stations connected through multiple channels; a control unit configured to adjust transmission time of the data frames, based on the length of the data frames within a transmission duration of an access point; and a transmission unit configured to transmit the data frames, the transmission time of which has been adjusted, to the respective wireless stations.

In accordance with the exemplary embodiments of the present invention, a single access point simultaneously controls multiple channels in a wireless LAN system using multiple channels so that a plurality of wireless stations are simultaneously provided with a high throughput service.

In addition, the size or length of data frames is adjusted according to downlink data frames related to a plurality of wireless stations connected through multiple channels, respectively, so as to guarantee compatibility enough to provide a wireless LAN service to the plurality of wireless stations.

The above-described methods can also be embodied as computer programs. Codes and code segments constituting the programs may be easily construed by computer programmers skilled in the art to which the invention pertains. Furthermore, the created programs may be stored in computer-readable recording media or data storage media and may be read out and executed by the computers. Examples of the computer-readable recording media include any computer-readable recoding media, e.g., intangible media such as carrier waves, as well as tangible media such as CD or DVD.

While the present invention has been described with respect to the specific embodiments, it will be apparent to those skilled in the art that various changes and modifications may be made without departing from the spirit and scope of the invention as defined in the following claims.

What is claimed is:

1. A medium access control method in a wireless LAN system using multiple channels, comprising:
    determining sizes of data frames related to a plurality of respective wireless stations connected through multiple channels;
    adjusting a length of at least one of the data frames or numbers of the data frames, related to the respective wireless stations, based on the sizes of the data frames, so that transmission start time and transmission end time of the data frames coincide during a transmission duration of an access point; and
    simultaneously transmitting the data frames, the length or the numbers of which has been adjusted, to the respective wireless stations during the transmission duration,
    wherein the data frames transmitted to the respective wireless stations simultaneously have a same length during the transmission duration, according to a coincidence of the transmission start time and the transmission end time of the data frames during the transmission duration,
    wherein the adjusting the length or the numbers of the data frames, the data frames related to the respective wireless stations are fragmented, or null data are added to the data frames related to the respective wireless stations,
    wherein the adjusting the length or the numbers of the data frames, when the respective wireless stations support different lengths of data frames, the length or the numbers of the data frames are adjusted based on data frames related to a wireless station supporting a smallest length of data frames,
    wherein the adjusting the length or the numbers of the data frames, the length or the numbers of the data frames is adjusted based on the length of a longest one of data frames related to a wireless station supporting the smallest length of data frames during the transmission duration of the access point.

2. The medium access control method of claim 1, wherein the data frames are MPDUs based on a medium access control protocol.

3. A medium access control method in a wireless LAN system using multiple channels, comprising:
    determining sizes of data frames related to a plurality of respective wireless stations connected through multiple channels;
    adjusting a length of at least one of the data frames or numbers of the data frames, related to the respective wireless stations, based on the sizes of the data frames, so that transmission start time and transmission end time of the data frames coincide during a transmission duration of an access point; and
    simultaneously transmitting the data frames, the length or the numbers of which has been adjusted, to the respective wireless stations during the transmission duration,
    wherein the data frames transmitted to the respective wireless stations simultaneously have a same length during the transmission duration, according to a coincidence of the transmission start time and the transmission end time of the data frames during the transmission duration,
    wherein the transmission duration of the access point is determined by a CTS (clear-to-send)-to-self (SCTS) frame and a CF-end frame transmitted by the access point, wherein the SCTS frame comprises a network allocation vector (NAV) value determined by the length of a longest one of the data frames related to the respective wireless stations.

4. The medium access control method of claim 3, wherein the SCTS frame is transmitted by the access point according to a backoff time or a PCF Interface Space (PIF) of a Point Coordination Function (PCF).

5. A medium access control method for medium access control in a wireless LAN system using multiple channels, comprising:
    determining sizes of downlink data related to a plurality of respective wireless stations connected through multiple channels;
    generating data frames for the respective wireless stations by adjusting a length of at least one of the data frames or numbers of the data frames for the respective wireless stations, based on the sizes of downlink data, so that the transmission start time and transmission end time of the data frames coincide during a transmission duration of an access point; and
    simultaneously transmitting the data frames to the respective wireless stations during the transmission duration, wherein the data frames transmitted to the respective wireless stations simultaneously have a same length during the transmission duration, according to a coincidence of the transmission start time and the transmission end time of the data frames during the transmission duration, wherein the transmission duration of the access point is determined by a CTS (clear-to-send)-to-self (SCTS) frame and a CF-end frame transmitted by the access point, and the SCTS frame comprises a network allocation vector (NAV) value determined by the length of a longest one of the data frames related to the respective wireless stations.

6. The medium access control method of claim 5, wherein the data frames related to the respective wireless stations are fragmented, or null data are added to the data frames related to the respective wireless stations.

* * * * *